US 6,692,689 B2

(12) United States Patent
Morando (10) Patent No.: US 6,692,689 B2
(45) Date of Patent: Feb. 17, 2004

(54) SINK ROLL ASSEMBLY WITH FORCED HYDRODYNAMIC FILM LUBRICATED BEARINGS AND SELF-ALIGNING HOLDING ARMS

(76) Inventor: Jorge A. Morando, 526 Riverview Trail, Cadiz, KY (US) 42211

( * ) Notice: Subject to any disclaimer, the term of this patent is extended or adjusted under 35 U.S.C. 154(b) by 46 days.

(21) Appl. No.: 10/020,101

(22) Filed: Dec. 14, 2001

(65) Prior Publication Data

US 2003/0111779 A1 Jun. 19, 2003

(51) Int. Cl.$^7$ ................................................. C21C 5/42
(52) U.S. Cl. ..................... 266/239; 118/423; 427/433
(58) Field of Search .................. 118/423, DIG. 15, 118/419; 420/586; 427/433; 266/239, 213

(56) References Cited

U.S. PATENT DOCUMENTS

| 5,549,393 A | * | 8/1996 | Morando | 384/203 |
| 5,718,517 A | * | 2/1998 | Morando | 384/192 |
| 5,958,518 A | * | 9/1999 | Sippola | 427/433 |
| 6,004,507 A | * | 12/1999 | Morando | 420/586 |
| 6,168,757 B1 | * | 1/2001 | Morando | 420/586.1 |

FOREIGN PATENT DOCUMENTS

JP          03115552 A    *   5/1991   .................. 118/400

* cited by examiner

Primary Examiner—Scott Kastler
(74) Attorney, Agent, or Firm—Charles W. Chandler (57) ABSTRACT

Self-aligning bearings are used for supporting a roll in molten zinc or zinc/aluminum, to permit the roll's shaft to align with the bearing axis between the pair of holding arms supporting the roll, and a pump for delivering metal under pressure to the bearing surfaces interface force a hydrodynamic film to lubricate the bearing components.

32 Claims, 6 Drawing Sheets

FIG. 1

T : RESULTANT TENSION FORCE = -P_F

P_F : RESULTANT HYDRAULIC FORCE ACTING ON THE ROLL TRUNNION

SINK ROLL ASSEMBLY WITH FORCED HYDRODYNAMIC FILM LUBRICATED BEARINGS AND SELF-ALIGNING HOLDING ARMS

BACKGROUND OF THE INVENTION

This invention is related to a sink roll assembly, used for providing tension to a metal strip while rotating in molten metal, that includes forced film lubricated bearings and self-aligning holding arms. Generally, a sink roll assembly as used in the galvanizing industry comprises the following components: a roll to guide and provide tension to the metal strip, holding arms at each end of the roll to support it, and bearings in each arm to allow for its rotation.

Sink roll shafts submerged in molten zinc or zinc aluminum typically have a very short life not only because of the distortion and misalignment created between the components by the high metal temperatures in which they are operating, but in addition, because of the chemical reactions that occur between the hot metal, the bearings and the roll shaft materials when operating on a boundary lubrication condition or metal-to-metal contact.

I have solved some problems related to these environmental conditions. See, for example, my U.S. Pat. No. 5,549,393 issued Aug. 27, 1996, for "Self-Aligning Bearing for High Temperature Applications", U.S. Pat. No. 5,718,517 issued Feb. 17, 1998, for "Self-Aligning Bearing for High Temperature Applications; U.S. Pat. No. 6,261,369 issued Jul. 17, 2001, for "Sink Roll for Galvanizing Bath"; U.S. Pat. No. 6,004,507 issued Dec. 21, 1999, for "Material Formulation for Galvanizing Equipment Submerged in Molten Zinc and Aluminum/Zinc Melts"; and U.S. Pat. No. 6,168,757 issued Jan. 2, 2001 for "Material Formulation for Galvanizing Equipment Submerged in Molten Aluminum and Aluminum/Zinc Melts".

The invention disclosed in this application enhances the sink roll assembly (roll/holding arms/bearings assembly) as currently being used while submerged in zinc and zinc/aluminum applications, by providing self-alignment capability to the roll/arm interface, and a pumping device connected to the submerged trunnion or roll to deliver pressurized molten metal at the bearing interface to balance the strip tension forces and generate a forced hydrodynamic film to lubricate the bearing components. A radial clearance of about 0.001 to 0.005 inches is provided by the delivered pressurized metal to act between the stationary and rotating surfaces to eliminate the normally metal-to-metal condition of sliding bearing components.

In addition, the rotating bearing components help to "drag" the hydrodynamic molten metal film into the created clearance, thus reducing sliding friction, micro welding and their consequent high wear.

The hydrodynamic film also functions as a hydraulic shock absorber besides avoiding metal-to-metal contact.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
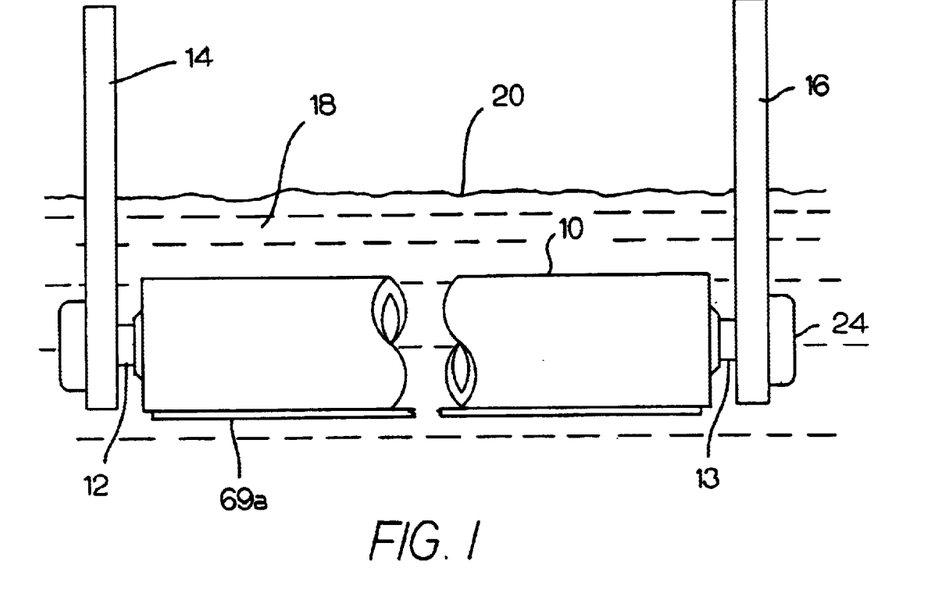
FIG. 1 is a view of a sink roll assembly, including self-aligning holding arms and forced film lubricated bearings supporting a roll in a bath of molten metal.
Figure 2:
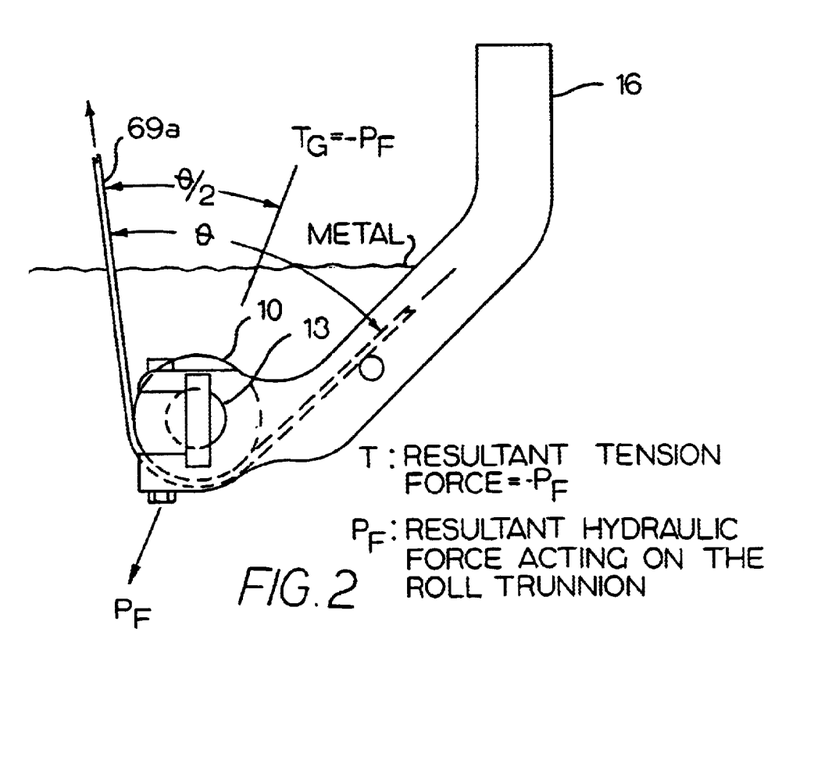
FIG. 2 is a view showing a holding arm with a preferred bearing.

Referring to the drawings, FIGS. 1 and 2 illustrate a preferred embodiment of the invention in which a roll 10 provided with sleeved trunnions 12 and 13 is mounted on a pair of holding arms 14 and 16 containing swivel motion and pumping capability. The lower part of the arms, roll, bearings and pumps are disposed in a bath 18 of molten zinc or zinc/aluminum alloy having a metal line 20. For illustrative purposes, the roll has a diameter of 24 inches, a length of 80 inches, and is formed of any standard alloy steel used for such applications. Appendix A describes the preferred materials of the various components.

The trunnions extend from each end of the roll. For illustrative purposes, the bearing that supports trunnion 12, on the left side of FIG. 1 will be described, however, it is to be understood that trunnion 13, at the opposite end of the roll, is supported by a similar bearing in a similar manner.

Figure 3:
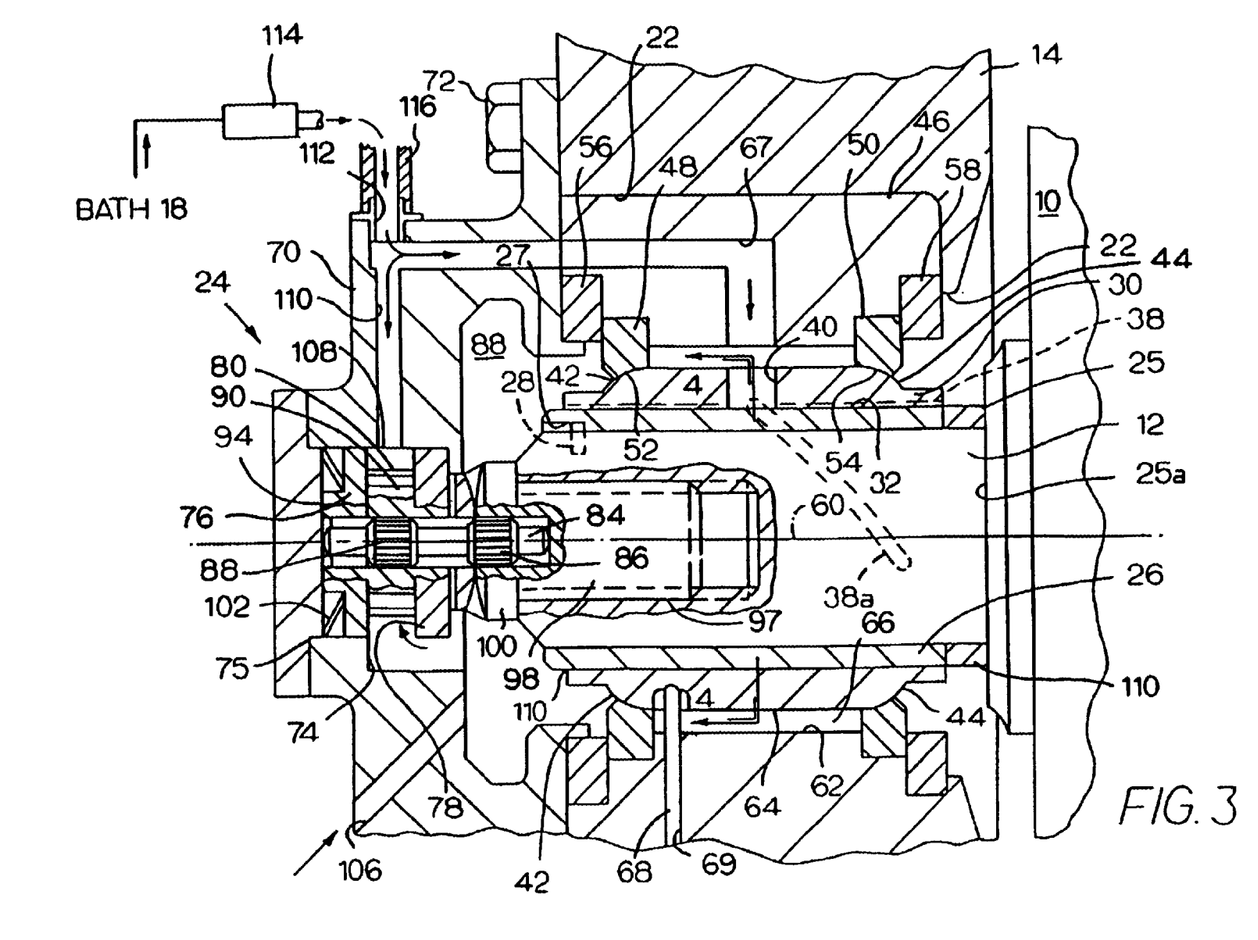
FIG. 3 is a longitudinal sectional and partially schematic view of the preferred sink roll assembly left end showing the roll trunnion end, the self-aligning holding arm assembly and the forced film lubricated bearing/pump assembly.

Referring to FIG. 3, trunnion 12 is solidly attached to the end of roll 10 and supported within an opening 22 in arm 14 by means of bearing assembly 24. A bearing sleeve 26 is installed on the trunnion until it abuts trunnion shoulder 25a. At this point, driving pins 28 are inserted in the trunnion in the provided holes. Sleeve 26 is then moved forward (left on the drawing) until a slot 27 on the sleeve engages each pin 28. This locks sleeve 26 to the trunnion forcing it to rotate together as a unit.

To prevent the axial displacement of sleeve 26, ring 25 is inserted in two semi-circular halves between sleeve 26 and trunnion shoulder 25a. The two halves of the ring are then welded to each other, locking sleeve 26 from any axial movement with respect to the trunnion.

The sleeved roll trunnion assembly is slideably mounted in annular rocking sleeve 30, part of the self-aligning arm assembly. A clearance 32 between the inner cylindrical surface of rocking sleeve 30 and the outer cylindrical surface of bearing sleeve 26 permits molten zinc to pass between the two sleeves forming a hydrodynamic zinc film 34, when trunnion 12 is rotating with roll 10. Film 34 is shown in a dark line in FIG. 4. The radial clearance 32 is about 0.001 to 0.005 inches to assist in forming the film.

Figures 4, 5, 6, 12:
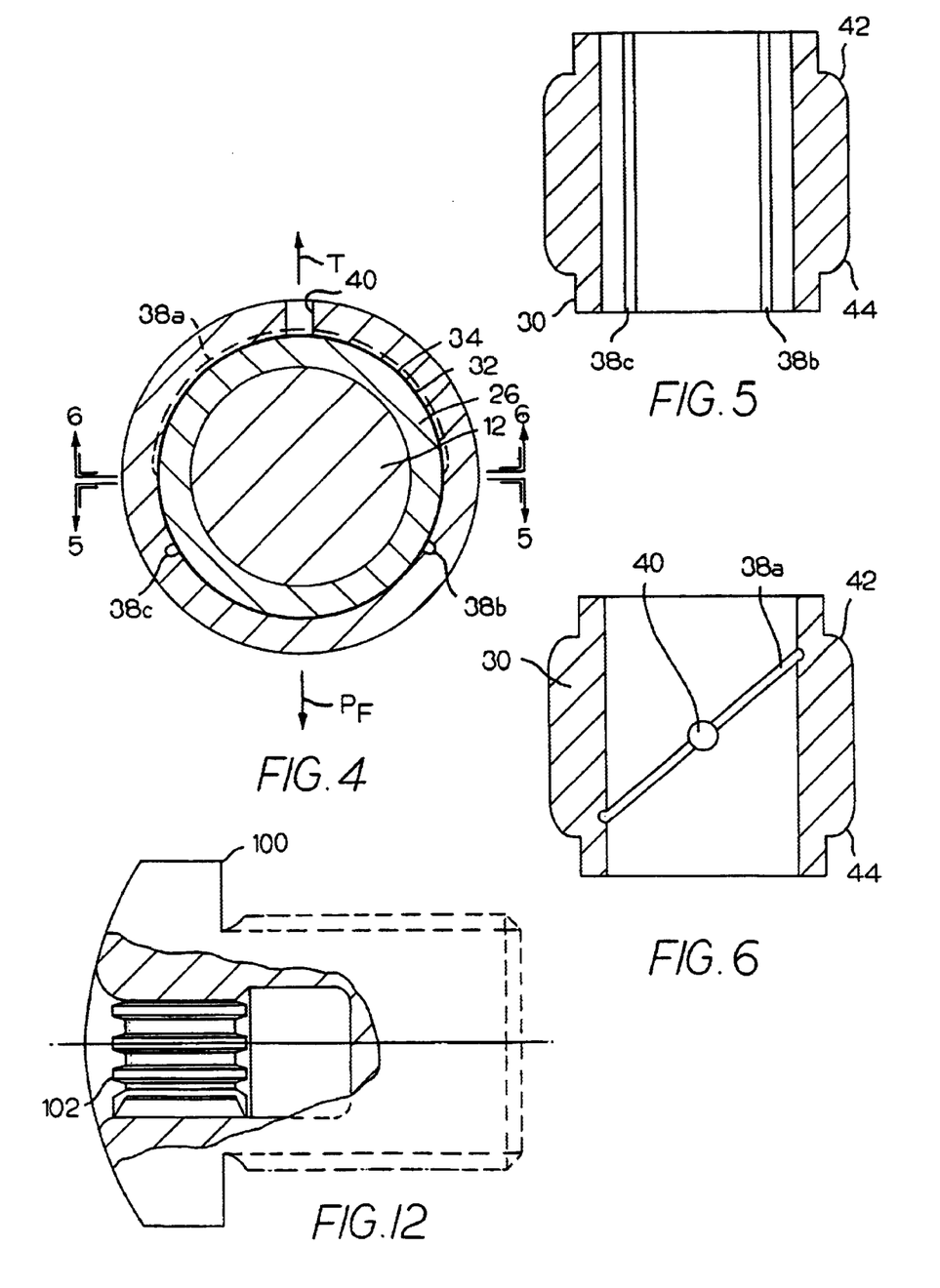
FIG. 4 is an enlarged sectional view as seen along lines 4—4 of FIG. 3.
FIG. 5 is a sectional view as seen along lines 5—5 of FIG. 4, with the trunnion and bearing sleeve removed.
FIG. 6 is another sectional view of the preferred holding arm rocking sleeve pressure distribution pattern as seen along lines 6—6 of FIG. 4.
FIG. 12 is a sectional view of the trunnion's axial stop and driving end.
Figure 7:
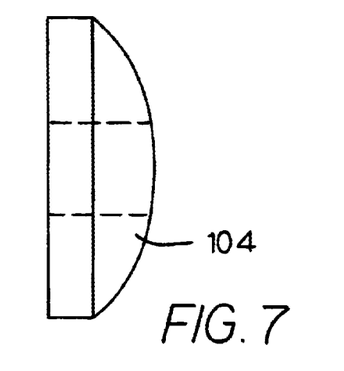
FIG. 7 is a view of the shaft stop insert.

Referring to FIGS. 4, 5, and 6, rocking sleeve 30 has a spiral groove 38a to deliver metal under pressure about 210° of the rocking sleeve internal peripheral surface. Referring to FIG. 2, this metal pressure acting on the roll trunnion generates a force $P_F$ equal and opposite to the strip tension $T_g$ thus balancing the roll and separating the bearing surfaces (trunnion sleeve—rocking sleeve) contact, eliminating metal-to-metal sliding friction.

Radial opening 40 supplies fluid metal to groove 38a. Parallel grooves 38b and 38c in the axial direction of trunnion are provided to discharge any excessive fluid pressure and to prevent it from reaching the wrong side of the bearing surface. The hydrodynamic film resultant pressure acting on the roll trunnion must be located in opposition to the metal strip resultant tension on the roll surface.

Referring to FIG. 3, rocking sleeve 30 is assembled as part of the self-aligning capability of arm 14. To that effect, rocking sleeve 30 has two convex, axially spaced, spherical, slideable, annular bearing surfaces 42 and 44. A bearing housing 46 inserted in cylindrical opening 22 in arm 14 supports a pair of axially spaced bearing alignment rings 48 and 50. The two alignment rings are fixed with respect to the bearing housing either by shrink fitting them into housing 46, or by pinning them to the housing in a manner similar to the pinning of sleeve 26 to trunnion 12, to prevent their relative rotation.

The bearing housing is also fixed with respect to arm 14. Alignment rings 48 and 50 have annular, concave, spherical bearing surfaces 52 and 54 slideably engaging the convex bearing surfaces 42 and 44, respectively, of rocking sleeve 30.

The design of the rocking sleeve with the annular spherical surfaces mating with alignment rings 48 and 50 with annular concave spherical surfaces is a very important part of this invention. The surface area in contact and, consequently, the width of the alignment rings is calculated based upon the following equation:

$$A_R = \frac{P}{2\sigma_{cy}} \therefore W_R = \frac{A_R}{D_R} = \frac{P}{2\sigma_{cy}D_R}$$

where:
  $A_R$ is the area in square inches of alignment ring necessary to carry the roll tension
  $W_R$ is the ring's width
  $D_R$ is the ring's diameter
  P is the roll tension in pounds
  $\sigma_{cy}$ is the compressive yield strength of the material of the alignment ring at the operating temperature in the molten metal bath On the other hand, the torque required to swivel or rock the trunnion with respect to the arm is given by the equation:

$$T_R = \delta A_R \frac{P}{2} D_R$$

where:
  δ is the coefficient of friction
  $A_R$ is the alignment ring area

Obviously, to minimize the torque required to swivel the trunnion, the area of contact between the two alignment rings must be minimized consistent with the compression strength capacity of the materials involved. To that effect and based on my previous patents, I have formulated materials AT 121B and AT 131 that retain a very high compressive strength and hardness ($R_C$>45) up to and beyond the operating temperatures encountered in galvanizing baths.

In addition to minimizing the torque to actuate the rocking sleeve 30 with respect to the stationary arm, alignment rings 48 and 50 act as wipers to remove and clean the spherical surfaces, in case any contamination becomes deposited on them. This feature has been thoroughly experimentally tested and a reduction in the operating torque of the roll was evident. No failures due to contamination jamming or excessive contact area friction were encountered.

Previously, spherical joints have been tested that consisted of a sphere contained within a hollow sphere machined in a housing. These designs, because of the roll shaft being five to six inches in diameter, required spheres with approximately 11 to 12 inches in diameter. The area of contact on a spherical design is 20 to 35 times larger than on the alignment rings design. Consequently, the large surface area in contact not only generated excessive torque to rock the trunnion (in some instances having the trunnion fail at its attachment to the roll) but in addition made them extremely sensitive to contamination, since the contamination is trapped in the small clearance between the spheres. This entrapped contamination increases even further the torque required to swivel or rock the trunnion with respect to the arm accelerating its failure. To alleviate this condition, a very large clearance between the inner sphere and the hollow sphere machined in the housing was provided, which in a sense defeated the whole purpose of the self-aligning design principle, creating pockets of large damaging contamination and vibration due to instability for lack of guidance. A similar problem with more severe failure modes is encountered on ceramic/steel versions where the miss-match of the coefficients of expansion generates excessive running clearances.

Figure 14:
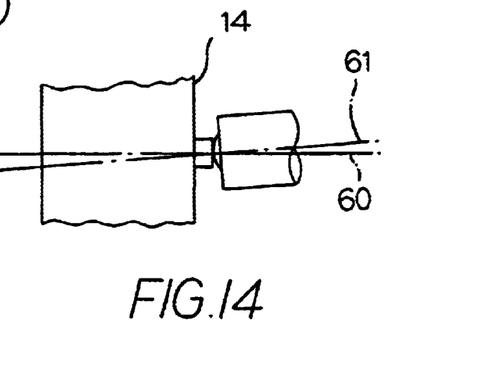
FIG. 14 is a schematic view illustrating how the roll trunnion axis becomes misaligned with the holding arms as the roll flexes.

Bearing surfaces 52 and 54 are axially shorter than their mating bearing surfaces 42 and 44 to permit rocking sleeve 30 to rotate and provide concentricity of trunnion axis 60 with respect to the fixed central axis 61 of the bearing in the holding arm. By these means, trunnion 12 with sleeve 26 can rock or tilt with respect to arm 14 in a motion accommodated by the alignment rings 48 and 50 and rocking sleeve 30, as shown in FIG. 14.

A pair of annular, axial retainers 56 and 58 are mounted in bearing housing 46 in abutment with the outer faces of alignment rings 48 and 50, locating them in an axial position with respect to the rocking sleeve. Retainers 56 and 58 are pressed fitted in a pair of openings in the bearing housing.

Bearing housing 46 has a cylindrical bore 62 that is radially spaced from the outer cylindrical surface 64 of the rocking sleeve, forming an annular passage 66 between the housing and the rocking sleeve. Passage 66 allows angular movement of rocking sleeve 30 and passes molten zinc to radial opening 40 in the rocking sleeve.

The bearing housing also has a fluid passage 67, which extends axially inwardly from the outer end of the housing, and then down to open into passage 66.

Pin 68 in passage 69 in the lower part of the bearing housing prevents over rotation of rocking sleeve 30, within the bearing housing but allows for sufficient angular movement. This arrangement ensures that a pressurized molten zinc film will always oppose the tension forces transmitted to the trunnions by the tension of strip 69a exerted on the roll, in a direction as illustrated in FIG. 1.

Referring back to FIG. 3, a bearing cover plate and pump housing 70 is attached by a plurality of threaded fasteners 72 (only one shown) to support arm 14, around opening 22. The cover plate has a chamber 74 for receiving a cartridge gear pump 75.

Referring to FIGS. 8–11, gear pump 75 includes a pair of end plates 76 and 78 and a center plate 80 fastened together into a unit by fasteners 82. A quill shaft 84 having splined ends 86 and 88 is rotatably supported by end plates 76 and 78.

Figure 8:
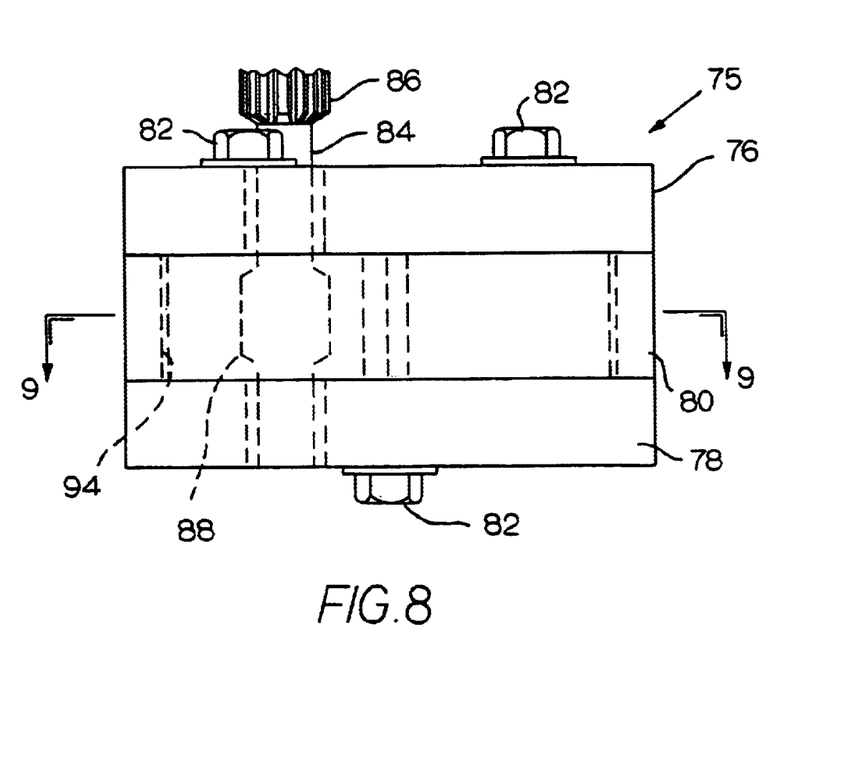
FIG. 8 is a view of a preferred cartridge type gear pump.
Figure 9:
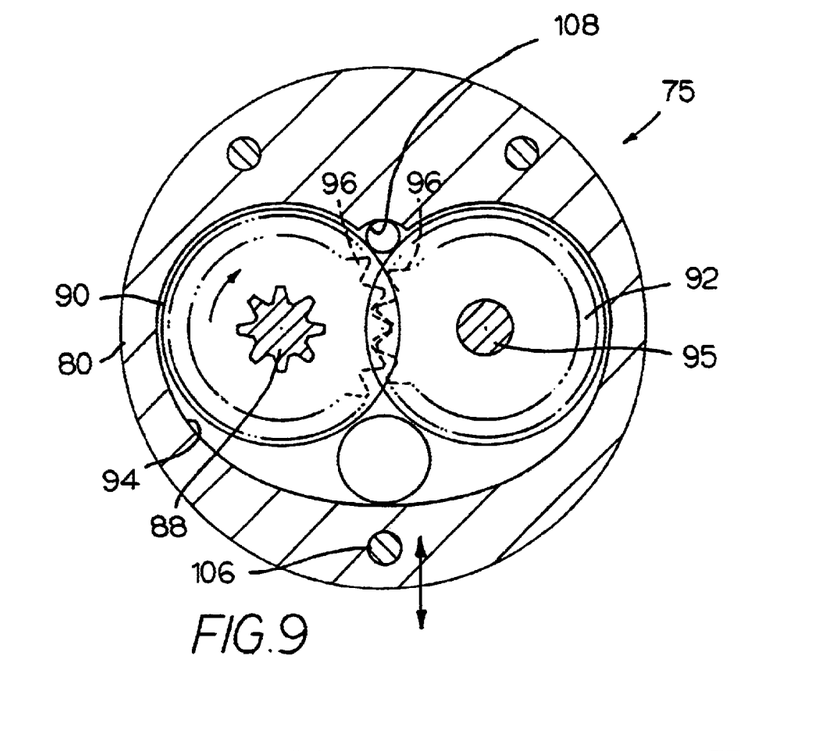
FIG. 9 is a sectional view through the gear pump as seen along lines 9—9 of FIG. 8.
Figure 10:
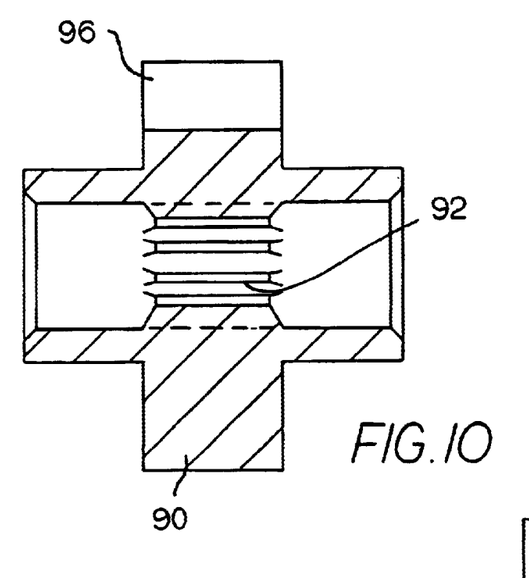
FIG. 10 is a sectional view of the pumping gear.
Figure 11:
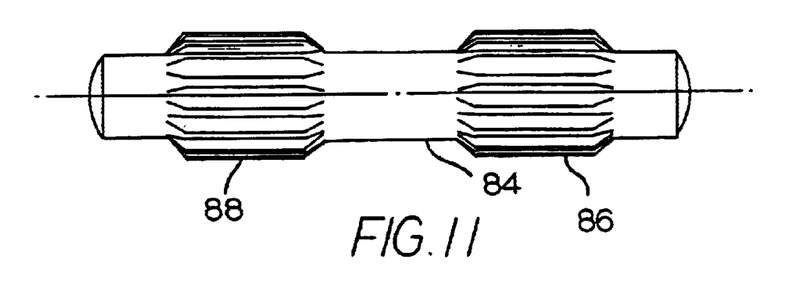
FIG. 11 is a view of the pump quill spline (driver shaft)

A pair of cooperating meshing pumping gears 90 and 92 are disposed in a pumping chamber 94 in center plate 80. Gear 92 is rotatably supported on a shaft 95 having its ends journalled in end plates 76 and 78. Pumping gear 90 has a splined bore mating with spline 88 of the quill shaft. Both of the pumping gears have an annular array of meshing gear teeth 96 so that gear 90 is a driver pumping gear, and gear 92 is a driven pumping gear.

Referring to FIGS. 3 and 12, the trunnion end has an internal threaded bore 97 which threadably receives the threaded end 98 of trunnion axial stop 100. Axial stop 100 has a splined inner bore 102 drivingly receiving splined end 86 of quill shaft 84.

The splined designs of the quill shaft and pumping gear permit misalignment, both radial and angular due to rocking sleeve 30 swiveling rotations.

During operation, sleeve roll trunnion 12, quill shaft 84 and pumping gear 90 rotate as a unit. A belleville spring 102, shown in FIG. 3, biases the gear pump toward the trunnion. An annular roll stop 104 is mounted between cover plate 70 and trunnion axial stop 100.

Roll 10 is rotated by moving metal strip 69a, and in turn, rotates trunnions 12 and 13. Trunnion 12 rotates the quill shaft which in turn causes pumping gears 90 and 92 to rotate and pump molten metal from inlet opening means 106 in a lower part of the cover plate, to an outlet opening 108. Outlet opening 108, as best shown in FIG. 3, discharges molten metal through a passage 110 to passage 67 in the holding arm assembly bearing housing.

The molten metal passes from outlet opening 108 through passage 67, to form hydrodynamic film 32 between the trunnion bearing sleeve and the rocking sleeve as the roll trunnion is being rotated, opposing and hydraulically balancing tension forces acting on the roll assembly. The metal film is sufficiently thick to eliminate metal-to-metal (boundary lubricating) contact between the rotating and stationary bearing sleeves, and also provides a hydrodynamic cushion between the interface of the two bearing sleeves.

The film of molten zinc then returns to bath 18 through the clearance between the bearing sleeve and the rocking sleeve, and grooves 38a and 38b.

The cover plate also has a top inlet opening 112 fluidly connected to an auxiliary pump 114 through a conduit 116. The auxiliary pump provides an alternative means for delivering molten zinc from the bath 18 to the bearing if the primary gear pump should fail.

FIGS. 1–11 illustrate an embodiment of the invention in which the trunnion is carried on the end of the roll.

Figure 13:
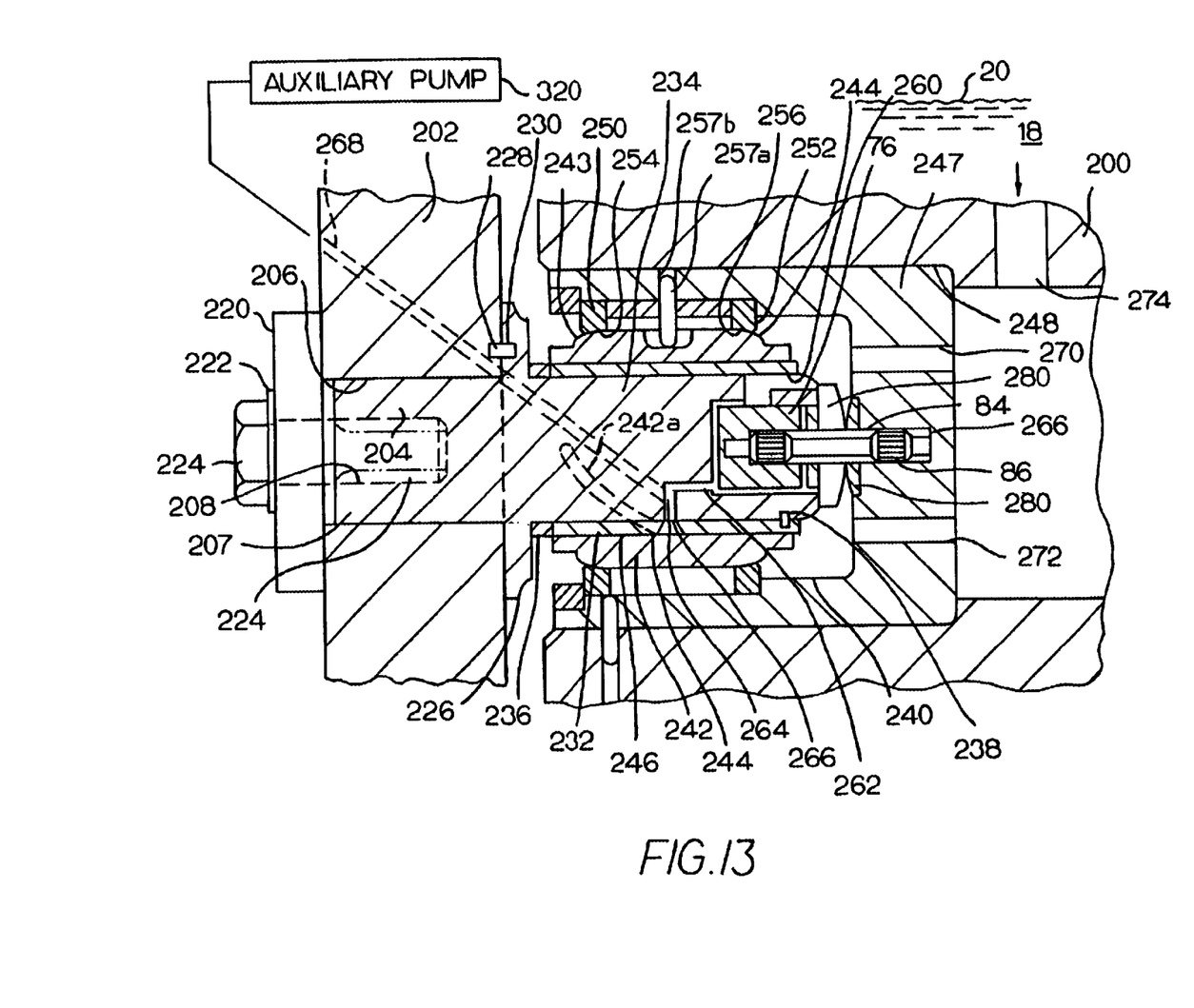
FIG. 13 is a view of another embodiment of the invention.

FIG. 13 illustrates another embodiment of the invention in which the trunnions are carried by the holding arms. Roll 200 is carried on a pair of holding arms 202, in the same manner that roll 10 is carried on holding arms 14 and 16. Roll 200 is supported on a pair of end trunnions 204, only one shown. Trunnion 204 is mounted in an opening 206 in holding arm 202. The lower part of the arm, the trunnion assembly and the roll bearing assembly are disposed in the bath of molten metal 18. Trunnion 204 extends from the holding arm, and a similar trunnion extends from a companion holding arm (not shown), which supports the other end of the roll. Both trunnions are identical.

Trunnion end 207 has a threaded opening 208. A spacer 220, a washer 222 and a bolt 224 are mounted on the outside of the holding arm. Bolt 224 is threadably engaged with threaded opening 208 to fasten the trunnion to the holding arm. The midsection of the trunnion has an integral collar 226 that is larger than the diameter of opening 206, and engages the inner surface of holding arm 202.

A pin 228 carried on the holding arm is received in an opening 230 in collar 226 to fix the trunnion to the holding arm to prevent either axial or rotational motion with respect to the holding arm.

A bearing sleeve 232 is installed on the inner end 234 of the trunnion. A ring 236 is mounted in two halves on the trunnion adjacent collar 226, and then welded to the collar after the bearing sleeve is installed and locked on the trunnion, by means of pin 238 inserted on the outer end of the trunnion, and received in a slot 240 in the bearing sleeve to prevent it from axial and rotational motion with respect to the trunnion, forcing it to move with the trunnion as one single part.

An annular rocking sleeve 242, (part of the self-aligning roll assembly) is rotatably, sliding mounted on the bearing sleeve. A clearance 244 (dark line) between the inner cylindrical surface of the rocking sleeve and the outer cylindrical surface of the bearing sleeve permits molten zinc to pass between the two sleeves forming a hydrodynamic zinc film 246 when the roll is rotated. Preferably, the radial clearance is about 0.001 to 0.005 inches to assist in forming the film.

Rocking sleeve 242 is identical to rocking sleeve 30 illustrated in FIG. 4, including an internal groove 242a for delivering metal under pressure between the two sleeves.

Rocking sleeve 242 has two convex, partially spherical, slidable annular bearing surfaces 243 and 244. A bearing housing 246, fixedly mounted in roll opening 248, supports a pair of bearing alignment rings 250 and 252. Alignment rings 250 and 252 have annular, concave, partially spherical bearing surfaces 254 and 256 slidably engaging convex bearing surfaces 243 and 244, respectively, of rocking sleeve 242. A pin 257a extends through the bearing housing into a groove 257b in the rocking sleeve, preventing rotation of the rocking sleeve but allowing for sufficient (±4°) angular movement of the roll with respect to the rocking sleeve 242.

Bearing surfaces 254 and 256 are axially shorter than their mating bearing surfaces to permit the rocking sleeve to tilt to accommodate any eccentricity of the trunnion axis with respect to the rotating axis of the roll. Roll 200 can rock or tilt with respect to the holding arm in a relative motion between rings 250 and 252, and rocking sleeve 242.

The trunnion has a gear pump chamber 260 adjacent trunnion inner end 234 closed by a threaded trunnion stop end 280. A lubricant passage 262 extends axially along the trunnion and then radially outwardly through a passage 264 to an opening 266 in the bearing sleeve to deliver liquid metal to the film between the cylindrical surfaces of the bearings.

A passage 268, fluidly connected to an auxiliary pump 320, extends through the holding arm 204 and the inner end of the trunnion to passage 264 to deliver a supply of molten metal to the bearings as an alternative means if the primary roll assembly driven pump should fail.

Bearing housing 246 has a pair of inlet passages 270 and 272 for passing molten zinc into the gear pump chamber. Roll 200 has a passage 274 for passing zinc into the interior of the roll and then to passages 270 and 272.

A cartridge gear pump 75 is mounted in gear pump chamber 260. Pump 75 is identical to the gear pump illustrated in FIG. 3, that is, it includes a quill shaft 84. Quill shaft 84 has a splined end 86 received in an internally splined opening 266 in bearing housing 246. Quill shaft 84 rotates with the roll assembly 200, and housing 246 and operates the gear pump to draw molten zinc from inlet openings 270 and 272 into passages 262 and 264 to form hydrodynamic film 246. An annular trunnion axial stop 280 is mounted between the trunnion stop end 280 and the bearing housing, on quill shaft 84. Film 246 provides a cushion between the two bearing sleeves 232 and 242.

Note that the rocker sleeves have the grooves arranged such that the film forms a cushion that opposes the resultant tension force "T" as indicated in FIG. 2. The force of the metal strip wrapped around roll 10 tends to separate the trunnion bearing sleeve and the rocker sleeve generating a gap between them for the molten metal to form a film.

The gear pump, operated by the rotation of the roll, can also be used to pump molten metal to a component unrelated to the roll supporting bearing, such as a filter for removing impurities from the molten metal.

APPENDIX A

|  |  | Material |
|---|---|---|
| 10 | Roll | 316L, 52100, etc. AT 103C, AT 103F |
| 14,16 | Roll Holding Arm | 316L/AT 141/AT 103C |
| 12, 13 | Roll Shaft (Trunnion) | AT 141/AT 141A |
| 46 | Bearing Housing | AT 141/AT 141A |
| 26 | Roll Shaft Sleeve | AT 101/AT 121A/AT 121B/AT 131 |
| 28 | Holding Pins (Shaft Sleeve) | AT 121/AT 141 |
| 48 | Bearing Alignment Ring | AT 101/AT 121A/AT 121B/AT 131 |
| 50 | Bearing Alignment Ring | AT 101/AT 121A/AT 121B/AT 131 |
| 30 | Rocking Sleeve | AT 103/AT 121A/AT 121B/AT 131 |
| 56 | Axial Retainer | AT 141/AT 141A |
| 58 | Axial Retainer | AT 141/AT 141A |
| 76, 78 | Pump End Plates | AT 121A/AT 131 |
| 84 | Pump Driver Shaft (Quill Spline) | AT 101/AT 121 |
| 90, 92 | Gear (2) | AT 101/AT 121A/AT 121B/AT 131 |
| 94 | Pump Cover Plate | AT 121A/AT 121B/AT 131 |
| 100 | Shaft Stop End | AT 121A |
| 102 | Belleville Spring | AT 141/AT 002 |
| 70 | Bearing Cover Plate and Pump Housing | AT 141 |
| 108 | High Pressure Line | 316L/330 |
| 120 | Shaft Stop Insert | AT 121B/AT 131 |

Alphatech, Inc. of Cadiz, Ky. provides alloy material At 101, AT 121, At 121B, AT 131, AT 141, and AT 141A resistant to molten zinc and $Z_nAL$ and AT 002 high temperature res. steel.

What is claimed is:

1. A rotatable self-lubricating apparatus supported by a hydrodynamic forced film lubricated bearing apparatus comprising:

a roll assembly having a strip-engaging roll and a trunnion;

an arm structure;

bearing means mounted on the arm structure for supporting the trunnion for rotation about an axis when the trunnion is submerged in a bath of a molten metal, the bearing means including:

a stationary first bearing member, and a second bearing member movable with respect to the first bearing member as the roll's trunnion is being rotated, the first bearing member and the second bearing member each being formed of a metal that is resistant to solution in the molten metal;

a pumping member suited for disposal in the molten metal and connected to the roll's trunnion for a pumping motion of the molten metal as the roll is being rotated; and a pump housing enclosing the pumping member in a pumping chamber, the pump housing having an inlet opening for receiving molten metal into the pumping chamber as the pumping member is moving in said pumping motion, the pump housing having an outlet means for delivering molten metal at a pressure sufficient to form a hydrodynamic film of the molten metal between the first bearing member and the second bearing member as the roll is being rotated.

2. A rotatable self-lubricating apparatus supported as defined in claim 1, including means connected to the roll's trunnion for rotating the pumping member in a bath of molten metal.

3. A rotatable self-lubricating apparatus supported as defined in claim 1, in which the bearing means comprises:

a bearing sleeve coaxially mounted on the roll's trunnion;

a rocking sleeve having a slidable fit on the bearing sleeve, the rocking sleeve having a convex spherical bearing surface;

an annular ring fixed with respect to the arm structure, the annular ring having a concave, partially spherical surface slidably engaging the convex bearing surface of the rocking sleeve;

whereby the rocking sleeve can swivel with respect to the arm structure to compensate for misalignment between the trunnion rotational axis.

4. A rotatable self-lubricating apparatus supported as defined in claim 1, in which the first bearing member comprises a first sleeve mounted on the shaft and rotatable therewith, the first sleeve having a cylindrical bearing surface, and the second bearing member comprises a second sleeve having a cylindrical bearing surface rotatably engaging the cylindrical bearing surface of the first sleeve, and molten metal received from the pumping chamber forms a hydrodynamic lubricating film between the cylindrical bearing surfaces of the first sleeve and the second sleeve.

5. A rotatable self-lubricating apparatus supported as defined in claim 4, in which one of the sleeves has at least one axial spiral distributing lubrication groove in the bearing surface thereof.

6. A rotatable self-lubricating apparatus supported as defined in claim 1, in which the pumping member comprises a rotatable driver pumping gear, and including a rotatable driven pumping gear meshing with the driver pumping gear, said driver pumping gear being connected to said roll's trunnion to rotate therewith;

such that as the trunnion is rotated, the driver pumping gear and the driven pumping gear cooperate to deliver a pressurized stream of molten metal, from a bath in which the roll and trunnion are submerged, toward an interface between the first and the second bearing members.

7. A rotatable self-lubricating apparatus supported as defined in claim 1, including an auxiliary pump operative to deliver a stream of molten metal from a bath of molten metal to the first and the second bearing members, independent of the rotation of the trunnion.

8. A rotatable self-lubricating apparatus supported as defined in claim 1, in which the roll's trunnion, the first bearing member and the second bearing member are formed of the same metal.

9. A rotatable self-lubricating apparatus supported as defined in claim 3, in which the bearing sleeve is formed of a harder material than the roll's trunnion.

10. A rotatable self-lubricating apparatus supported as defined in claim in which the lubricating film forms a hydrodynamic cushion between the rocking sleeve and the bearing sleeve, by opposing radial loads acting on the roll's trunnion.

11. A rotatable self-lubricating apparatus for supporting a rotatable shaft or trunnion in a bath of a molten metal, comprising:

an arm structure;

a roll assembly including a trunnion;

bearing means mounted on the arm structure for supporting the trunnion for rotation about an axis, when the trunnion is submerged in a bath of a molten metal, the bearing means including:
a first bearing member;
a second bearing member movable with respect to the first bearing member as the trunnion is being rotated, the first bearing member and the second bearing member each being formed of a metal that is metallurgically resistant to solution in the molten metal; and
a pumping member also resistant to solution in the molten metal and operative to deliver a lubricating hydrodynamic film of the molten metal between the first bearing member and the second bearing member as the trunnion is being rotated.

12. A method for lubricating a bearing apparatus supporting a rotatable roll having a shaft or trunnion in a bath of a molten metal, comprising:

providing an arm structure providing a trunnion;

mounting bearing means on the arm structure for supporting the trunnion for rotation about an axis when submerged in a bath of a molten metal, the bearing means including:
a first bearing member;
a second bearing member movable with respect to the first bearing member as the trunnion is being rotated, the first bearing member and the second bearing member each being formed of a metal that is metallurgically resistant to solubility in the molten metal; and
pumping the same molten metal of the bath in which the bearing means is disposed to form a lubricating hydrodynamic film of the molten metal between the first bearing member and the second bearing member as the trunnion is being rotated.

13. A self-lubricating apparatus for supporting a rotatable roll in a bath of a molten metal, comprising:

an arm structure;

a trunnion attached to said arm structure;

a strip-engaging roll;

bearing means mounted on the arm's trunnion for supporting the roll for rotation about an axis when the trunnion is submerged in a bath of a molten metal, the bearing means including:
a first stationary bearing member, and a second bearing member movable with respect to the first bearing member as the roll is being rotated by a moving strip, the first bearing member and the second bearing member each being formed of a metal that is resistant to solution in the molten metal;
a pumping member suited for disposal in the molten metal and connected to the roll for a pumping motion as the roll is being rotated; and
a pump housing enclosing the pumping member in a pumping chamber, the pump housing having an inlet opening for receiving molten metal into the pumping chamber as the pumping member is moving in said pumping motion, the pump housing having an outlet opening means for delivering molten metal at a pressure sufficient to form a hydrodynamic separating and lubricating film of the molten metal between the first bearing member and the second bearing member as the roll is being rotated.

14. A self-lubricating bearing apparatus as defined in claim 13, in which the bearing means comprises:

a bearing sleeve coaxially mounted on the trunnion;

a rocking sleeve having a rotary slidable fit on the bearing sleeve, the rocking sleeve having a convex partially spherical bearing surface;

an annular ring carried by the roll, the annular ring having a concave, partially spherical surface slidably engaging the convex bearing surface of the rocking sleeve;

whereby the roll can swivel with respect to the trunnion to compensate for changes in position of the trunnion rotational axis.

15. A self-lubricating bearing apparatus as defined in claim 13, in which the first bearing member comprises a first sleeve fixedly mounted on the trunnion, the first sleeve having a cylindrical bearing surface, and the second bearing member comprises a second sleeve having a cylindrical bearing surface rotatably engaging the cylindrical bearing surface of the first sleeve, and molten metal is received from the pumping chamber to form a hydrodynamic lubricating film between the engaging bearing surfaces of the first sleeve and the second sleeve.

16. A self-lubricating apparatus as defined in claim 13, in which the bearing sleeve is formed of a harder material than that of the trunnion.

17. A self-lubricating apparatus as defined in claim 13, in which the lubricating film forms a hydrodynamic cushion in a clearance between the rocking sleeve and the bearing sleeve.

18. A method for lubricating a bearing apparatus supporting a rotatable shaft or trunnion in a bath of a molten metal, comprising:

providing an arm structure;

mounting a trunnion on the arm structure; providing a roll that is rotated by a strip of metal engaging a cylindrical surface on the roll;

mounting bearing means on the roll for supporting the roll for rotation on the trunnion about an axis when submerged in a bath of a molten metal, the bearing means including:
a first bearing member;
a second bearing member movable with respect to the first bearing member as the roll is being rotated, the first bearing member and the second bearing member each being formed of a metal that is metallurgically resistant to solubility in the molten metal; and
pumping the same molten metal of the bath in which the bearing is disposed to form a lubricating hydrodynamic film of the molten metal between the first bearing member and the second bearing member as the roll is being rotated.

19. A self-lubricating rotatable apparatus for supporting a roll in a bath of molten metal, comprising:

a trunnion member having external cylindrical bearing surface;

an elongated stationary holding arm for supporting a roll rotated by a moving metal strip about a first axis such that the strip defines a resultant force on the trunnion member;

a bearing sleeve member disposed on the trunnion member, the bearing sleeve having an internal bearing surface facing the trunnion bearing surface;

a clearance between the bearing surface of the trunnion member and the bearing surface of the sleeve member;

one of said members being connected to the holding arm;

the other of said members being connected to the roll; and means for delivering molten metal into said clearance to form a hydrodynamic film cushion between the trunnion member bearing surface and the sleeve member bearing surface opposing said resultant force.

20. A pumping apparatus for moving a liquid in a bath of the liquid, comprising:

an arm structure;

a roll assembly comprising a roll and a trunnion suited for rotation by a moving strip of material partially wrapped around the roll;

a pumping member suited for disposal in a liquid and connected to the roll's trunnion to be driven in a pumping motion of the liquid as the roll is being rotated; and a pump housing enclosing the pumping member in a pumping chamber, the pump housing having an inlet opening for receiving the liquid into the pumping chamber as the pumping member is moving in said pumping motion.

21. A pumping apparatus as defined in claim 20, in which the roll is formed of a material that is resistant to molten metal when the roll is driven in a bath of the molten metal.

22. A pumping apparatus as defined in claim 21, in which the arm structure has an opening for receiving and supporting the pump housing.

23. A pumping apparatus as defined in claim 21, in which the roll has an opening for receiving and supporting the pump housing.

24. A pumping apparatus as defined in claim 21, in which the pump housing is carried on the arm structure.

25. A pumping apparatus as defined in claim 21, including a filter apparatus for filtering the molten metal, and the pump housing is connected to the filter apparatus to pass molten metal therethrough.

26. A method for lubricating a bearing apparatus supporting a rotatable shaft or trunnion in a bath of a molten metal, comprising:

providing an arm structure;

attaching a trunnion on the arm structure;

providing a roll that is rotated by a strip of metal engaging a cylindrical surface on the roll;

mounting bearing means on the roll for supporting the roll for rotation on the trunnion about an axis when submerged in a bath of a molten metal, the bearing means including:

providing a first bearing member;

providing a second bearing member movable with respect to the first bearing member as the roll is being rotated, forming the first bearing member and the second bearing member of a metal that is metallurgically resistant to solubility in the molten metal; and pumping the same molten metal of the bath in which the bearing is disposed with a sufficient fluid pressure to hydrodynamically separate the first bearing member and the second bearing member.

27. Apparatus useful for moving molten metal in a bath of the metal, comprising:

a roll assembly having a strip-engaging roll and a trunnion;

an arm structure;

bearing means mounted on the arm structure for supporting the trunnion for rotation about an axis when the trunnion is submerged in a bath of a molten metal, the bearing means including:

a stationary first bearing member, and a second bearing member movable with respect to the first bearing member as the roll's trunnion is being rotated, the first bearing member and the second bearing member each being formed of a metal that is resistant to solution in the molten metal; and a pumping member suited for disposal in the molten metal and connected to the roll's trunnion for a pumping motion of the molten metal as the roll is being rotated.

28. Apparatus as defined in claim 27, in which the first bearing member has a bearing axis, and the trunnion is rotatable about a trunnion axis, and one of said bearing members can swivel with respect to the arm structure to compensate for misalignment between said bearing axis and said trunnion axis.

29. Apparatus as defined in claim 27, in which the second bearing member has an axis of rotation, and the trunnion is fixed on the arm structure against rotation about a trunnion axis, and one of said bearing members can swivel with respect to the arm structure to compensate for misalignment between said bearing axis and said trunnion axis.

30. In a roll apparatus for supporting a moving strip of metal in a bath of molten metal, the combination comprising:

a roll;

a trunnion connected to the roll or rotation;

a bearing supporting the trunnion for rotation;

the roll being disposed in a pot of molten metal to support a moving strip of metal passing around said roll, and applying a force $T_g$ tending to separate the trunnion from metal-to-metal contact with the bearing, and balancing a force $P_f$ of the molten metal on the roll in the opposite direction; and the bearing diameter and the trunnion diameter forming a clearance therebetween sufficient to pass the molten metal in a hydrodynamic film between the trunnion and the bearing.

31. In a roll apparatus for supporting a moving strip of metal in a bath of molten metal, the combination comprising:

a roll;

a trunnion connected to the roll for rotation with respect to the roll;

a bearing carried by the roll and supporting the trunnion for rotation;

the roll disposed in a pot of molten metal to support a moving strip of metal passing around said roll, and applying a force tending to urge the bearing into metal-to-metal contact with the trunnion; and the bearing diameter and the trunnion diameter having an opening therebetween sufficient to pass the molten metal in a hydrodynamic film between the trunnion and the bearing to prevent metal-to-metal contact between the bearing and the trunnion.

32. A method for supporting a strip of metal passing through a pot of molten metal, comprising the steps of:

guiding a strip of metal around a roll in a pot of molten metal;

providing a support in the molten metal;

providing a bearing opening in said support;

providing a trunnion on the roll and in the bearing opening;

providing a clearance between the trunnion and the bearing opening sufficient to pass the molten metal in said clearance between the bearing opening and the trunnion; and rotating the roll to pass the molten metal into said clearance to form a hydrodynamic film in said clearance to prevent metal-to-metal contact between the trunnion and the bearing opening.

* * * * *